F. X. WAGNER.
TYPE WRITING MACHINE.
APPLICATION FILED MAY 12, 1908.
Reissued June 8, 1909.
12,970.
4 SHEETS—SHEET 1.
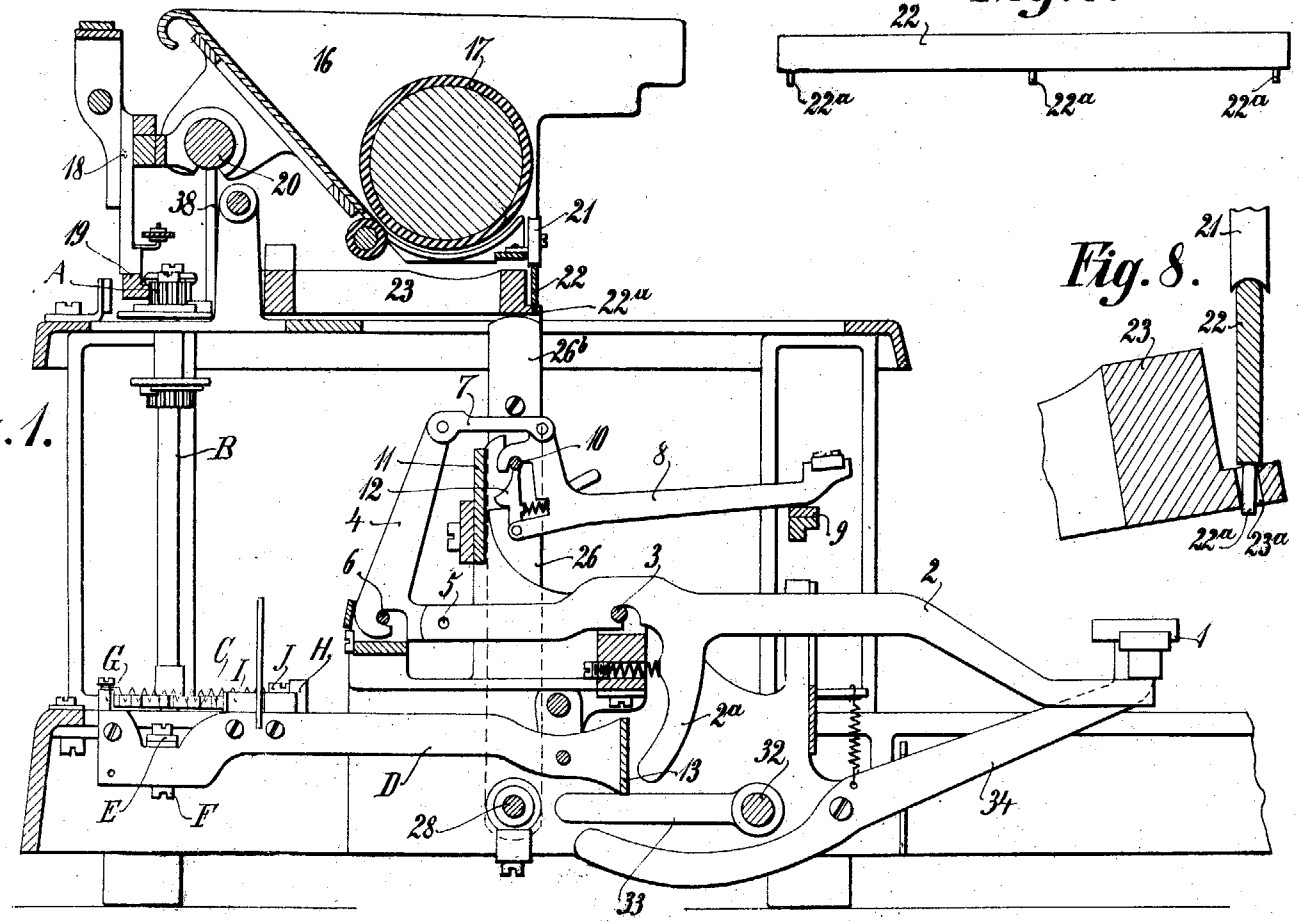
Witnesses:
W. Fritze
John C. Seifert
Inventor:
Franz X. Wagner,
Underwood Typewriter Company,
assignee,
By B. C. Stickney,
Attorney.

F. X. WAGNER.
TYPE WRITING MACHINE.
APPLICATION FILED MAY 12, 1908.
Reissued June 8, 1909.
12,970.
4 SHEETS—SHEET 2.
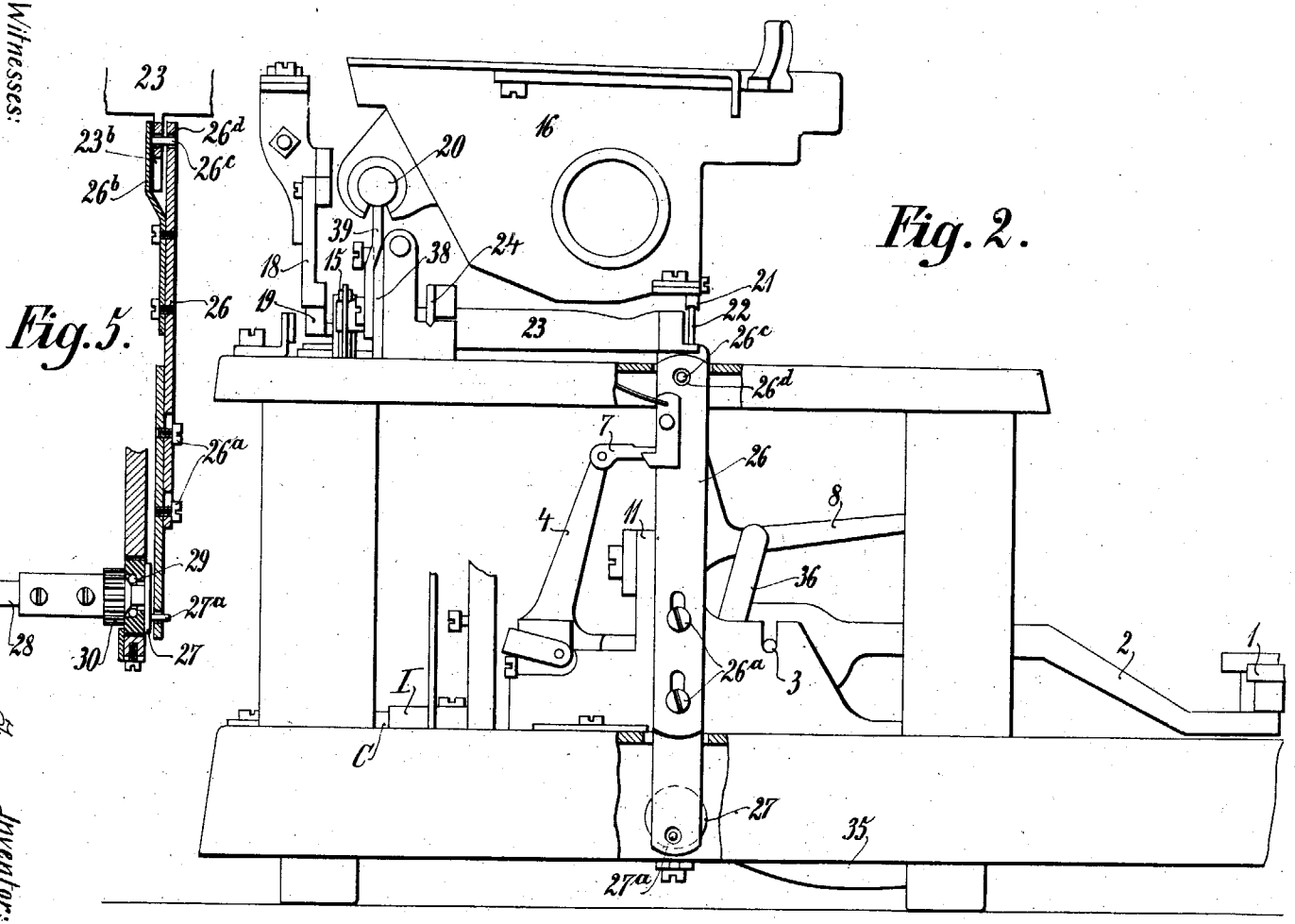
Witnesses:
W. Fritze
John C. Seifert
Inventor:
Franz X. Wagner,
Underwood Typewriter Company,
Assignee,
By P. C. Ottickney,
Attorney.

F. X. WAGNER.
TYPE WRITING MACHINE.
APPLICATION FILED MAY 12, 1908.
Reissued June 8, 1909.
12,970.
4 SHEETS—SHEET 3.
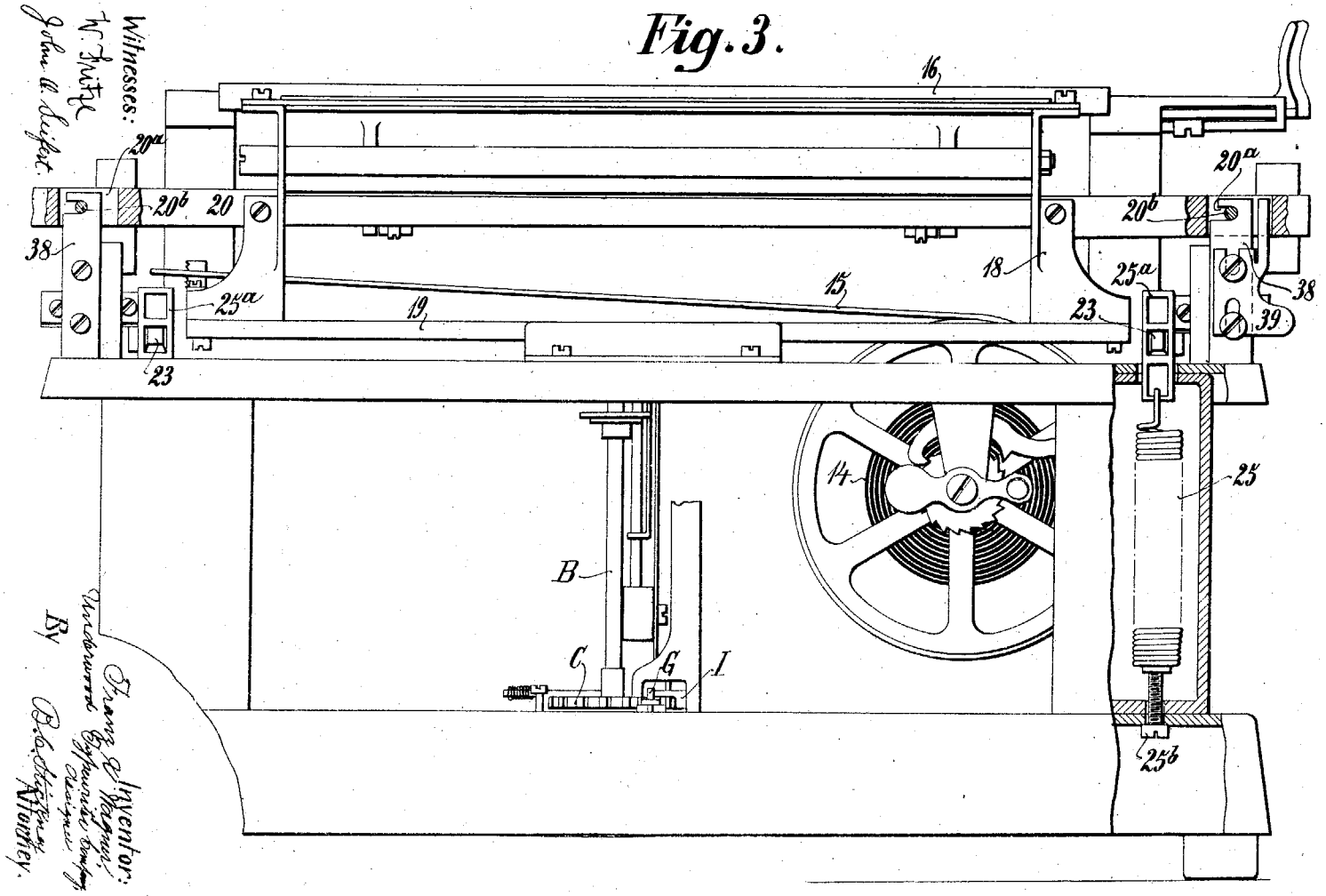

F. X. WAGNER.
TYPE WRITING MACHINE.
APPLICATION FILED MAY 12, 1908.
Reissued June 8, 1909.
12,970.
4 SHEETS—SHEET 4.
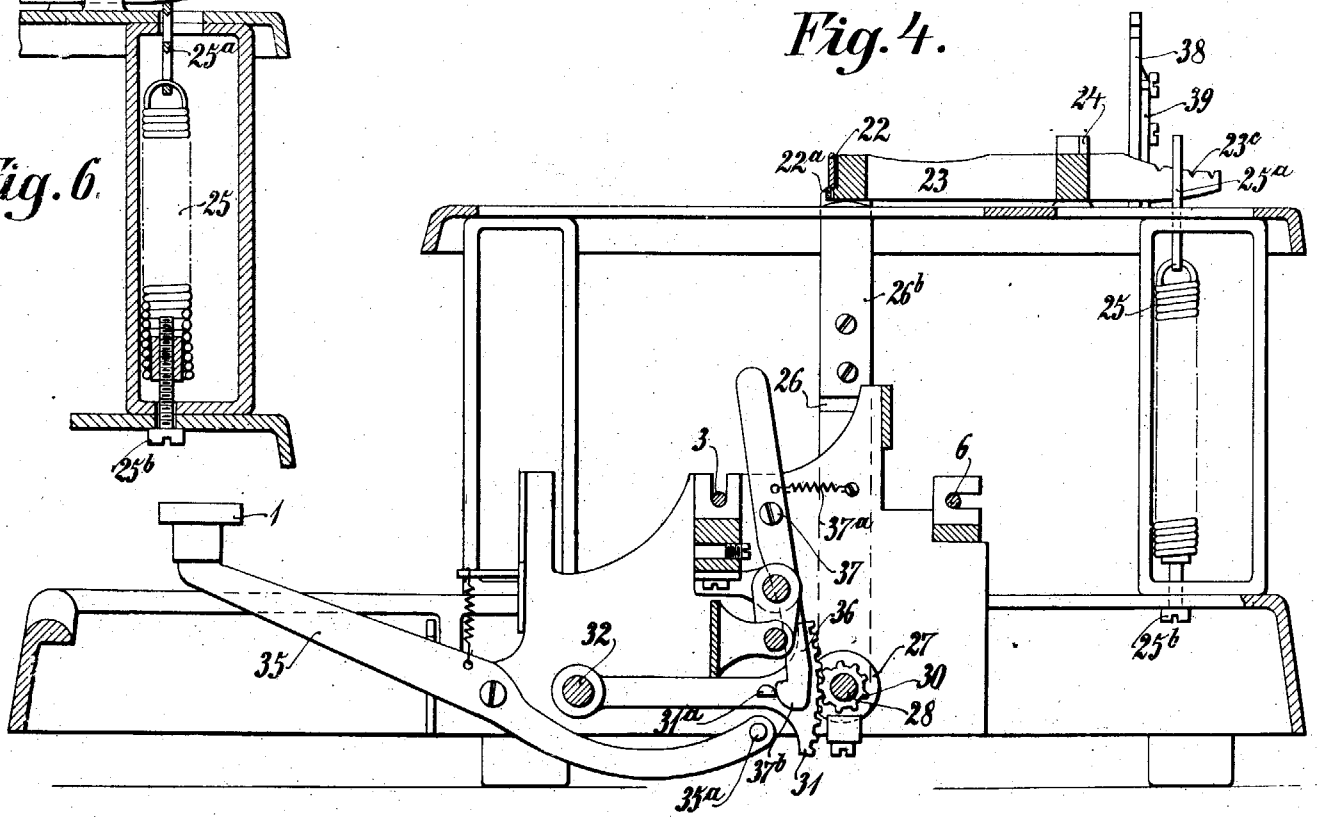
Witnesses:
W. Fritzel
John C. Seifert
Inventor:
Franz X. Wagner
Underwood Typewriter Company,
assignee,
By B. C. Stickney,
Attorney

UNITED STATES PATENT OFFICE.

UNDERWOOD TYPEWRITER COMPANY, OF NEW YORK, N. Y., ASSIGNEE OF FRANZ X. WAGNER.

TYPE-WRITING MACHINE.

No. 12,970. Specification of Reissued Letters Patent. Reissued June 8, 1909.

Original application filed November 12, 1904, Serial No. 232,413. Divided and application filed May 18, 1905, Serial No. 260,983. Original No. 873,641, dated December 10, 1907. Application for reissue filed May 12, 1908. Serial No. 432,440½.

*To all whom it may concern:*

Be it known that FRANZ X. WAGNER, a citizen of the United States, resident of the borough of Bronx, city, county, and State of New York, has invented certain new and useful Improvements in Type-Writing Machines, of which the following is a specification.

The invention relates to typewriting machines and has for its object to improve the carriage mechanism and the platen shifting mechanism of such machines.

The invention will be fully described hereinafter and the features of novelty pointed out in the appended claims.

The present application is a division of one filed in the United States Patent Office on November 12, 1904, Serial No. 232,413.

Reference is to be had to the accompanying drawings in which—

Figure 1 is a central sectional elevation of a typewriting machine embodying my improvements. Fig. 2 is an elevation of such machine from the left side with the parts in section. Fig. 3 is a rear elevation partly in section. Fig. 4 is a sectional elevation substantially on the line 4—4 of Fig. 3. Fig. 5 is a sectional elevation of the lifting bar of the shifting frame. Fig. 6 is a detail elevation showing the spring for balancing the shift frame. Fig. 7 is a detail front view of the shift rail. Fig. 8 is an enlarged section showing the connection of the shift rail with the shift frame.

The type bar action comprises the keys 1, mounted on levers 2, which are fulcrumed at 3, preferably in such a manner as to be easily removable. Each key lever is connected with an elbow lever 4 by means of a pin-and-slot connection 5, said elbow lever being fulcrumed at 6 upon the frame of the machine. Each elbow lever is connected by means of a link 7, with a type bar 8, normally resting on a cushion 9. The type bar 8 is fulcrumed at 10 upon the segment 11 and is preferably held in place by means of a latch 12. The key lever 2 also operates the escapement mechanism in any approved manner for instance, through the medium of a universal bar 13 engaged by a toe $2^a$ on the key lever 2. The carriage is fed in the usual manner by means of the spring 14, connected with the tape 15, one end of which is secured to the carriage. The carriage consists of two portions, the front portion 16, which carries the platen 17, and the rear portion 18 which carries the feed rack 19 and may also carry other parts as for instance parts of the carriage stop mechanism which are not shown in the present application but which have been embodied in another divisional application filed concurrently herewith. The feed rack 19 carried by the rear portion 18 of the carriage is adapted to be engaged by a pinion A, carried by a shaft B near its upper end. Near its lower end the shaft B carries an escapement wheel C. A bar D extends from the center of the universal bar 13 and is secured at its rear end to a cross bar E fulcrumed to the frame at F. The bar D carries an escapement pawl G, which normally arrests a tooth of the escapement wheel C on the shaft B. The bar D is further provided with a projection H in engagement with the stop pawl I, fulcrumed on the frame of the machine at J and pulled against the projection H by a spring. Thus as the universal bar is moved rearward, the pawl G releases the escapement wheel C, and the end of the stop pawl I is swung into the path of the escapement wheel. Both carriage portions are pivotally supported on the rear rod 20 of the machine frame, on which rod the carriage travels transversely of the machine. The front portion of the carriage is also provided with one or more rollers 21 adapted to travel on a rail 22, carried by the shift frame 23.

As shown best in Figs. 7 and 8, the rail 22 is provided with pins $22^a$ adapted to be received in openings $23^a$ with sufficient play to allow the rail to swing pivotally relatively to the frame 23 and to remain substantially vertical even when the frame 23 is tilted slightly backward by being raised to its upper position. This shift frame 23 is hung on the frame of the machine by means of knife edges 24 (see Figs. 2 and 6) and a spring 25 is employed to press the shift frame 23 upward so as to counter-balance the weight of the front portion 16 of the carriage. In order that the action of the spring may be adjusted, it is preferred to provide a series of notches, $23^c$, in the shift frame as shown in Fig. 6; by engaging the hook $25^a$, connected with the spring 25, with one or the other of these notches, the purchase of the spring is varied.

The tension of the spring can be varied by engaging either the upper or the lower opening of the hook $25^a$ with the frame 23. The tension of the spring 25 may be further adjusted by means of the screw $25^b$ which holds the lower end of the spring.

The mechanism for shifting the platen portion of the carriage into position for the printing of either small characters or capitals is as follows: The shift frame 23 (see Figs. 2, 4 and 6) is connected pivotally at both ends by lugs $23^b$ with lifting bars 26, preferably made in two sections, adjustable by means of screws $26^a$, so that the said lifting bars may be lengthened or shortened. The upper portions of said bars have spring members $26^b$ carrying the connecting pins $26^c$ which enter into openings $26^d$ in the lifting bars 26; thus if it is desired to disconnect the lifting bars 26 from the shift frame 23, to permit of the removal of said shift frame, the spring members $26^b$ are pressed away from the lugs $23^b$, thus allowing the connecting pins $26^c$ to be withdrawn from the openings $26^d$ in the lifting bars 26 and the shift frame to be removed. The lower end of each lifting bar has an opening through which projects a pin $27^a$, mounted eccentrically upon a disk 27 secured to a shaft 28. This shaft is journaled in the frame by means of ball bearings 29, and also carries a pinion 30 (see Figs. 4 and 5). This pinion is located only at one side of the machine and engages a toothed sector 31 on a rock shaft 32. This rock shaft at the other end of the machine carries an arm 33 (see Fig. 1). Shift keys 34 and 35 respectively are adapted to engage the arm 33 and the arm of the sector 31. Thus by depressing either one of the shift keys the carriage will be moved to its upper position, but if the shift key 34 has been depressed, the carriage will not return to its lower position upon the release of said shift key, but will be held in its upper position owing to the engagement of a latch 36 pivoted at 37 with a projection $31^a$ of the sector 31. The latch 36 is under the influence of a spring $37^a$ and has a beveled surface $37^b$ at the bottom, which surface is adapted to be engaged by a pin $35^a$ on the shift key 35. Thus if the carriage is locked in its upper position and it is desired to release it, the shift key 35 is depressed and the pin $35^a$ will swing the latch 36 clear of the projection $31^a$ and allow the carriage to drop. It will of course be understood that if the shift key 35 is depressed while the carriage is in its lower position, the carriage will be raised but will drop back as soon as the shift key is released, owing to the fact that the pin $35^a$ keeps the latch 36 away from the pin $31^a$, until the latter is about in the position shown in Fig. 4. The latch 36 can be rendered inactive, if desired, by swinging its upper end forward into frictional engagement with a surface of the frame, so that the latch will be held out of the path of the shift key 35 until the operator restores the latch to its normal position.

It is desired to call particular attention to the fact that the eccentric pins $27^a$ reach their dead center positions when the carriage is in its upper or its lower printing position, thus locking the shift frame 23 against accidental movement in either printing position.

In order to allow the carriage to be readily removed, there is provided the following construction, shown in Fig. 3. The frame rod 20 on which the carriage moves has at its ends two recesses $20^a$, facing in the same direction in which recesses are located pins $20^b$, adapted to be engaged by stationary slotted supports 38 carried by the frame of the machine. The slots or recesses $20^a$ are somewhat wider than the supports 38 so that the rod can be slid lengthwise to disengage the pins $20^b$ from the slots of the supports 38. In order to lock the rod 20 in position, there is provided a latch 39 movable vertically to fill the space between one of the supports 38 and the wall of the recesses $20^a$ as shown at the right in Fig. 3. By this construction the carriage can be readily removed from the machine, and another carriage of different width substituted therefor.

Various modifications may be made without departing from the nature of the invention.

Claims.

1. In a typewriter, or like machine, a carriage, a shift frame for moving the carriage into different printing positions, bars connected with said frame, a pinion, a toothed sector engaging said pinion, a shaft carrying said pinion and provided with eccentric portions engaging said shift bars, and a shift key for swinging said sector.

2. In a typewriter, or like machine, a shift frame for the platen portion of the carriage, a shaft carrying two arms, one of which is provided with a toothed sector, means operated by said toothed sector for shifting the platen section of the carriage, a latch adapted to hold one of said arms in its raised position, and shift keys arranged to engage the said arms, one of the shift keys being constructed to swing said latch out of its locking position.

3. In a typewriter, or like machine, a shift key, a rocking arm adapted to be operated by said shift key and provided with a toothed sector lying in the same plane with the arms, a pinion engaging with said sector, and a shift frame for the platen section of the carriage, adapted to be moved by the turning of said pinion.

4. In a typewriter, or like machine, a removable carriage having a bar provided with recesses, stationary supports arranged to extend into part of said recesses, a pin and slot connection between said supports and said bar, and a latch extending into one of said recesses to lock the carriage to the frame of the machine.

5. In a typewriter, or like machine, stationary supports having open slots facing in the same direction, a removable carriage provided with a bar having recesses of greater width than said supports, and pins to fit into the slots of the supports, and a movable latch arranged to extend into one of said recesses between one of the supports and a wall of said recess.

6. In a typewriter, or like machine, a carriage having a front section carrying a platen and a separate rear section connected with said front section and carrying a member of the step by step feed mechanism, each section being mounted to swing about the same axis.

7. In a typewriter, or like machine, a carriage having a platen section and a separate escapement section connected therewith, each mounted to swing about the same axis.

8. In a typewriter, or like machine, a shift frame for the platen portion of the carriage, and a shift rail engaged by the carriage and loosely mounted on the shift frame to always remain substantially vertical.

9. In a typewriter, or like machine, a vertically movable shift frame for the platen portion of the carriage, and a shift rail engaged by the carriage and pivoted to said shift frame about a horizontal axis.

10. In a typewriter or like machine, a vertically movable shift frame for the platen portion of the carriage, said shift frame being pivotally supported by means of knife edges.

11. In a typewriter or like machine, a carriage, a shift frame for moving the carriage into different printing positions, and mechanism for operating said shift frame, said mechanism being upon a dead center when the carriage is in a printing position, to lock the shift frame against accidental movement.

12. In a typewriter or like machine, a carriage, a shift frame for moving the carriage into different printing positions, bars connected with said frame, eccentrics for operating said bars, and means for turning the eccentrics, said eccentrics being arranged to reach their dead center positions when the carriage is in a printing position.

13. In a typewriter or like machine, a carriage having a movable platen portion, means arranged to shift said platen portion and to move in unison therewith, a projection on said means, a latch normally in the path of said projection adapted to lock the platen portion of the carriage in one of its positions, and a shift key disconnected from the latch but arranged to disengage said latch from said projection.

14. In a typewriter or like machine, a carriage, a shift frame for moving the carriage into different printing positions, lifting bars detachably connected with said frame, eccentrics for operating said bars, and means for turning the eccentrics, said eccentrics being arranged to reach their dead center positions when the carriage is in a printing position.

15. In a typewriter or like machine, a carriage, a shift frame for moving the carriage into different printing positions, lifting bars connected with said frame, movable means mounted on said lifting bars for normally locking said shift frame and lifting bars together and arranged to be moved to permit said shift frame to be disengaged from said lifting bars, and mechanism for operating said lifting bars, said mechanism being upon a dead center when the carriage is in a printing position, to lock the lifting bars against accidental movement.

16. In a typewriter or like machine, a carriage, a shift frame for moving the carriage into different printing positions, lugs on said shift frame, lifting bars connected with said lugs, spring pressed means mounted on said lifting bars for normally locking said lifting bars to said lugs, and adapted to be pressed aside to permit said lifting bars to be disconnected from said lugs, and mechanism for operating said lifting bars, said mechanism being upon a dead center when the carriage is in a printing position, to lock the lifting bars against accidental movement.

17. In a typewriting machine, the combination of a platen and a type-support, one of which is adapted to be shifted to change the relation of the type and the printing-point, an actuating device for said shifting part, and an eccentric connected between said operating device and said shifting part and which is turned by said actuating device from one rest position to another to shift said shifting part, said eccentric automatically acting in its rest positions to positively hold said shifting part against vibration in either direction from either of the two positions to which it is moved by the eccentric, substantially as set forth.

18. In a typewriting machine, the combination of a platen and a type-support one of which is adapted to be shifted to change the relation of the type and the printing-point, an oscillatory eccentric, a connection between said eccentric and said shifting part arranged to prevent movement of the shifting part independently of the eccentric, and means for oscillating said eccentric from one to the other of its dead-center positions whereby the shifting part is shifted and positively held from vibration in both positions, substantially as set forth.

19. In a typewriting machine, the combination of a platen and a type-support, one of which is adapted to be shifted to change the relation of the type and the printing-point, an oscillatory eccentric, a link connected to said eccentric and to said shifting part, and means for oscillating said eccentric from one to the other of its dead-center positions whereby the shifting part is shifted and positively held from vibration in both positions, substantially as set forth.

20. In a front-strike typewriting machine, the combination of a platen and a type-support one of which is adapted to be shifted vertically to change the relation of the type and the printing-point, an oscillatory eccentric, a link connected to said eccentric and to said shifting part, and means for oscillating said eccentric from one to the other of its dead-center positions whereby the shifting part is shifted by said eccentric and stationarily supported by the eccentric in either of two positions, substantially as set forth.

21. In a typewriting machine, the combination with a platen and a type-support, one of which is adapted to be shifted to change the relation of the type and the printing-point, of a shift-lever, a second lever having a rocking connection with said shift-lever, and an eccentric connection for transmitting motion from said second lever to the shifting part and for holding the shifting part from rebounding when shifted, substantially as set forth.

22. In a typewriting machine, the combination with a support for a series of type-bars each having a plurality of printing characters, and a platen, one of which is adapted to be shifted to change the relation of said support and platen, of a shift-key, an eccentric actuated by said shift-key, and a device positively connected to said eccentric and to the shifting part, said eccentric being arranged to rest substantially on a dead-center when in its normal position and hold the shifting part against change of position until the shift-key is moved, substantially as set forth.

23. In a typewriting machine, the combination with a support for a series of type-bars each having a plurality of printing characters, and a platen, one of which is adapted to be shifted to change the relation of said support and platen, of a shift-key, an eccentric actuated by said shift-key, and a device positively connected to said eccentric and to the shifting part, said eccentric being arranged to rest substantially on a dead-center when in its shifted position and hold the shifting part in shifted position until the shift-key is moved toward its normal position, substantially as set forth.

24. In a typewriting machine, the combination with a support for a series of type-bars each having a plurality of printing characters, and a platen, one of which is adapted to be shifted to change the relation of said support and platen, of a shift-key, an eccentric actuated by said shift-key, and a connection pivoted to said eccentric and to the shifting part, said eccentric being arranged to oscillate between two substantially dead-center positions and to change the position of the shifting part when moving from one dead-center position to the other, substantially as set forth.

25. In a typewriting machine, the combination with a support for a series of type-bars each having a plurality of printing characters, and a platen, one of which is adapted to be shifted to change the relation of said support and platen, of a shift-lever, and a connection between said lever and the shifting part constructed to move the shifting part with a slow starting motion increasing during the first part of its movement and decreasing during the last part of its movement, substantially as set forth.

26. In a typewriting machine, the combination of a platen and a type-support, one of which is adapted to be shifted to change the relation of the type and the printing-point, an oscillatory eccentric, a link connected to said eccentric and to said shifting part, a gear-segment having a toothed engagement with said eccentric, and means for operating said gear-segment to turn said eccentric one-half revolution from one to the other of its dead-center positions, substantially as set forth.

27. In a front-strike typewriting machine, the combination of a platen and a type-support, one of which is adapted to be shifted up and down to change the relation of the type and the printing-point, an oscillatory eccentric arranged below said shifting part, a link connected to said eccentric and to said shifting part, a gear-segment having a toothed engagement with said eccentric, and means for operating said gear-segment to turn said eccentric one-half revolution from one to the other of its dead-center positions, substantially as set forth.

28. In a typewriting machine, the combination with a support for a series of type-bars each having a plurality of printing characters, and a platen, one of which is movable to change the relative position of said support and platen, of a horizontal shift-lever pivoted between its ends, a horizontal auxiliary lever arranged over the shift-lever and having a rocking bearing thereon, and an eccentric connection between said auxiliary lever and shifting part whereby the relation of the type-bar support and platen is changed, substantially as set forth.

29. In a typewriting machine, the combination of a part adapted to be shifted to change the relation of the printing-point and the type, a shift-key, and an actuating device for said shifting part which is moved by said shift-key and is constructed to shift said shifting-part with a slow-starting and slow-stopping motion and to automatically hold the same against vibration in either direction from either of two different positions, substantially as set forth.

30. In a typewriting machine, a case-shifting mechanism comprising, in combination, a member shiftable to upper case position, a key to shift said member and control its return to normal position; means releasable by said key being provided to lock said shiftable member in both normal and shifted positions; so that normally said member is locked, but upon depression of the key it is unlocked, shifted and locked in shifted position, and so that upon release of the key from pressure, said member is unlocked and returned to normal position and again locked.

Signed at New York, in the county of New York and State of New York, this 11th day of May, 1908.

UNDERWOOD TYPEWRITER COMPANY,
*Assignee of Franz X. Wagner.*
By DE WITT BERGER,
*Treasurer.*

Witnesses:
I. K. FRANKFORT,
JOHN O. SEIFERT.